3,502,655
PENICILLINS AND PROCESS FOR
PREPARING THEM
Heinz Oppinger, Hofheim, Taunus, Hinrich Hoffmann, Kelkheim, Taunus, Max Kornlein, Frankfurt am Main, Adolf Oppermann, Hofheim, Taunus, and Manfred Schorr, Frankfurt am Main, Germany, assignors to Farbwerke Hoechst Aktiengesellschaft vormals Meister Lucius & Bruning, Frankfurt am Main, Germany, a corporation of Germany
No Drawing. Filed Dec. 19, 1966, Ser. No. 602,527
Claims priority, application Germany, Dec. 21, 1965,
F 48,063
Int. Cl. C07d 99/14
U.S. Cl. 260—239.1                2 Claims

ABSTRACT OF THE DISCLOSURE

Thienyloxy-methyl penicillins of the formula

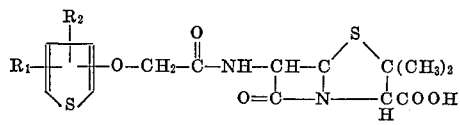

where $R_1$ and $R_2$ are hydrogen or methyl, and salts thereof. Method for preparing such penicillins by fermenting a culture medium with a penicillin-forming fungus in the presence of a thienyloxy acid acid precursor of the formula

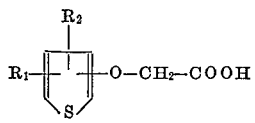

or of its functional equivalents.

---

Since it has become known that the addition of phenylacetic acid as a precursor to a culture solution of penicillium chrysogenum favors the formation of a certain penicillin, namely penicillin G, various attempts have been made to prepare penicillins of other properties than those known by adding different kinds of precursor substances.

At first Behrens et al. examined various precursor substances; the salts of certain new pinicillins (for example phenoxymethyl penicillin, phenylmercapto-methyl-penicillin etc.) are the subjects of various U.S. and British patents.

In addition to these results Brandl and Margreiter found out that phenoxy-methyl-penicillin (which they named penicillin V) can be crystallised in the form of its free acid and exhibits a high stability against acids. For this reason the above penicillin is particularly useful for oral administration.

Another highly acid-stable penicillin, p-cresoxy-methyl-penicillin, can be obtained by addition of p-cresoxy-acetic acid as a precursor.

4 - fluorophenyl-mercapto-methyl-penicillin, which is particularly effective against gram-negative organisms, is obtained by addition of 4-fluoro-phenylmercapto-acetic acid as a precursor.

Alkyl-mercapto-phenoxy-methyl-penicillins can also be prepared by fermentation.

Now we have found that thienyloxy-methyl-penicillins of the general Formula I

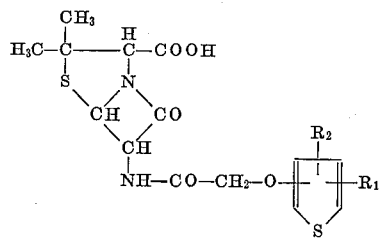

wherein $R_1$ and $R_2$ each represents hydrogen or a methyl group, and salts thereof, can be prepared by adding to a culture solution innoculated with a penicillin-forming fungus, at the beginning of the fermentation or portionwise or continuously, as precursors thienyloxy-acetic acids of the general Formula II

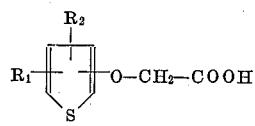

wherein $R_1$ and $R_2$ have the meanings given above, or the salts thereof, the corresponding aldehydes or alcohols, or the functional derivatives of these compounds, and isolating from the corresponding penicillins from the fermentation solution.

According to the present invention, the following thienyloxy-acetic acids can be used, for example: 2-thienyloxy-acetic acid, 3-thienyloxy-acetic acid, 5-methyl-2-thienyloxy-acetic acid, 3,5-dimethyl-2-thienyloxy-acetic acid, 2-methyl-3-thienyloxy-acetic acid, 3-methyl-4-thienyloxy acetic acid, 2-methyl-4-thienyloxy-acetic acid, 2,5-dimethyl-3-thienyloxy-acetic acid, 2,3-dimethyl-4-thienyloxy-acetic acid.

The thienyloxy-acetic acids can be obtained according to known processes, for example by reaction of hydroxythiophenes with the corresponding α-halogen-fatty acid esters and by subsequent saponification.

The quantity of the precursor to be added is preferably such that the pH-value of the culture solution during the fermentation remains within the range of from 5.5 to 8.0, preferably from 6.0 to 6.6.

The penicillin in question can be isolated after discontinuance of the fermentation by methods known per se, e.g. by extraction from the filtered culture solution. After acidification to a pH-value of about 1.5 to about 2.5 the culture filtrate is extracted with an organic solvent immiscible with water, for example ethyl acetate, chloroform, preferably butyl acetate. The penicillin is then separated from the filtrate and introduced into a nearly neutral or weakly alkaline buffer solution, preferably phosphate buffer, having a pH-value of about 6.0 to about 8.5, preferably 7.0 to 7.5 and after acidification, extracted therefrom with an organic solvent immiscible with water, for example ethyl acetate, chloroform, preferably butyl acetate, at a pH-value of about 1.5 to about 2.5.

Furthermore we have found that, whereas the penicillin V can be isolated with difficulty only, the penicillins of the general formula I can surprisingly enough be easily separated from unconsumed precursor substances, carried along during extraction, by a simple and economical method which consists in precipitating the penicillins from the organic solvent, preferably from butyl acetate, by fractionation with a solid or preferably dissolved salt of an aliphatic carboxylic acid containing 1 to 20 carbon atoms. Such aliphatic carboxylic acids are preferably fatty acids containing 1 to 9 carbon atoms, but also fatty acids of higher molecular weight, for example palmitic acid, oleic acid, stearic acid or likewise dicarboxylic acids, for example oxalic acid or malonic acid. As solvents for the carboxylic acid salt there are mentioned in particular low molecular weight aliphatic alcohols or ketones containing 1 to 5 carbon atoms, preferably methanol or acetone. As salts of aliphatic carboxylic acids there may be used alkali metal, alkaline earth metal, ammonium salts or salts of nitrogen-containing bases, but preferably alkali metal salts and in particular potassium salts such as, for example, potassium acetate, the potassium salt of ethyl-hexane-carboxylic acid or the potassium salt of diethylacetic acid.

It is surprising that, when the carboxylic acid salt used as precipitating agent is added portionwise, the precursor is precipitated in the first fractions. The penicillin is precipitated in the following fractions. The boundary is clearly marked.

It could not be expected that the penicillins could be separated from the precursor in this manner, since penicillin V, as will be shown in Examples 10 and 11, cannot be separated from the phenoxy-acetic acid used as precursor with the aid of the process described above. Rather, it is necessary in the case of penicillin V, to effect the isolation with organic solvents. Other methods described are even more expensive and lead to greater losses. According to the present process it is possible to obtain by a simple method pure salts, preferably the potassium salts of thienyloxy-methyl-penicillins, from which penicillins of high purity can be obtained by simply dissolving them in water and precipitating the free acid, by which process the acid is obtained in crystallised form.

The penicillins obtained occording to the process of the invention in the form of their salts or free acids are solid, in most cases well crystallised products. The free acids are sparingly soluble in water, but easily soluble in most organic solvents. According to the bases used the solubility of the salts in water differs largely; the sparingly soluble salts are useful for depot preparations having a prolonged activity. Owing to their stability against acids the penicillins of the present invention can also be used orally for therapeutic purposes. They have an excellent antibacterial activity particularly against gram-positive organisms. The compounds described in the following examples have a marked C=O band at 1760–1785K, which is ascribed to the β-lactam ring.

The following examples serve to illustrate the invention but they are not intended to limit it thereto.

EXAMPLE 1

A sterile pre-stage solution (composition: 2.0 g of cane sugar, 7.0 g. of cornsteep liquor, 1.0 g. of fatty oils, and 1.0 g. calcium carbonate in 100 ml. of water) is inoculated with spores of penicillium chrysogenum and shaken for 26 hours at 25° C. One liter of this culture solution is introduced into the main fermentation stage (sterile nutrient solution: 6:45 kg. of cornsteep liquor, 2.28 kg. of lactose, 0.75 kg. of $CaCO_3$, 0.45 kg. of primary potassium phosphate, 40 g. of $MgSO_4$ and 340 ml. of fatty oils in 60 l. of water), which has been fermented at 25° C, while thoroughly stirring and introducing sterile air. From the 38th hour onward every 6 hours 22.5 g. of the potassium salt of 3-thienyloxy-acetic acid, dissolved in 300 ml. of water, are added as precursor in 16 individual doses respectively. After a fermentation period of 164 hours, 3980 units of penicillin per ml. are obtained. The volume is then 58 litres of culture solution, which is liberated from mycelium by filtration. The mycelium is washed with 44 litres of water. The 3-thienyloxy-methyl-penicillin is extracted from the filtrate at a pH of 2 with the aid of 20 litres of butyl acetate and transferred from the organic phase into a Na-K-phosphate-bicarbonate buffer solution of a pH of 9.0, whereby the pH-value changes to 7.0. The penicillin is again extracted from this solution by addition of 2.5 liters of butyl acetate at a pH-value of 2 and the separated butyl acetate solution is dried with 250 g. of anhydrous sodium sulfate.

The penicillin is separated from the precursor simultaneously present in the butyl acetate solution, by fractional precipitation of the potassium salts, which crystallise out by addition of a 20% solution of anhydrous potassium acetate in methanol. The isolation is affected by filtration with suction, washing with a small amount of acetone and drying for 10 hours in vacuo (2–5 mm. Hg) at room temperature. Under these conditions the potassium salt of 3-thienyloxy-methyl-penicillin still contains water of crystallisation.

| Fraction No. | K-acetate solution added, ml. | Yield, g. | Content, u./mg. |
| --- | --- | --- | --- |
| 1 | 125 | 69.0 | <20 |
| 2 | 125 | 48.0 | <20 |
| 3 | 150 | 51.3 | <20 |
| 4 | 150 | 91.2 | 1,260 |
| 5 | 150 | 22.1 | 1,250 |
| 6 | 170 | (*) | |

* No precipitation.

In this manner in fractions 4 and 5 alone a total of 143.5 million units or 61.7% of the penicillin present in the culture solution are isolated. A further 9.7 million units (=4.2%) can be separated from the mother liquor in the same manner by using smaller volumes, so that the total yield amounts to 65.9%.

Fractions 1–3 contain the precursor (3-thienyloxy-acetic acid) in practically pure form as the potassium salt in a total yield of 168.3 g. or 37.7% of the precursor used for the fermentation. This can be employed without further purifications in the following fermentation.

The potassium salt of 3-thienyloxy-methyl-penicillin crystallises from butyl acetate forming colorless needles, which in many cases stick together in the form of bunches and which melt at approximately 208–212° C. with foam formation and decomposition.

IR-spectrum: a small, very strong band at 1783K, measured in pressed KBr, is ascribed to the β-lactam ring. Stronger bands, which are not observed in the IR spectrum of the potassium salts of penicillin V and penicillin G and make the difference between the newly obtained penicillin and the above-mentioned penicillins, are at 1542, 1443, 1399, 1263, 1158, 1138, 861 and 838K.

UV-spectrum: flat bands of medium intensity at approximately 237 mμ and flat minimum at approximately 245 mμ.

Determinations of activity: one unit is the quantity of penicillin, which is chemically equivalent to 0.6 mcg. of penicillin G-sodium. According to the biological test (against Staphylococcus aureus ATCC 6538 P) gives for crystal water-containing potassium salt of 3-thienyloxy-methyl-penicillin approximately 260 u./mg., whereas the pure anhydrous potassium salt contains 1515 u./mg.

Stability to acids: after one hour at pH 2 in HCl-glycocoll buffer and at 20° C. the remaining biological activity is about 96% of that of the potassium salt used.

Solubility: easily soluble in water; fairly soluble in methanol; sparingly soluble in alcohols containing 2 and more carbon atoms, in ether, acetone, ethy and butyl acetate, benzene, alkanes and chlorinated hydrocarbons.

EXAMPLE 2

The fermentation is carried out according to Example 1, adding, however, from the 41st hour onward as precursor every 6 hours in 16 individual doses 11.25 g. of the potassium salt of 3-thienyloxy-acetic acid, each dissolved in 300 ml. of water. After 143 hours of fermentation 3050 u./mg. are obtained, the volume of the culture solution is 64 liters. After filtration and washing with 46 liters of water a butyl acetate solution dried with anhydrous sodium sulfate is obtained according to Example 1. By fractionated precipitation with methanolic potassium acetate solution, after filtering with suction and washing with a small amount of acetone, crystallised products are obtained, which are dried for 5 hours at 40° C. in vacuo (2–5 mm. Hg).

| Fraction No. | Potassium acetate solution added, ml. | Yield, g. | Content, u./mg. |
| --- | --- | --- | --- |
| 1 | 50 | 31.3 | <20 |
| 2 | 50 | 18.3 | <20 |
| 3 | 100 | 39.3 | <20 |
| 4 | 100 | 80.0 | 1,394 |
| 5 | 100 | (*) | |

* No precipitation.

Fraction 4 thus contains 111.5 million units or 57.2% of the penicillin in the fermented culture solution. Further small amounts of penicillin can be isolated from the butyl acetate mother liquor.

Fractions 1–3 contain the precursor in a yield of 43.2%, which can directly be used in the following fermentation.

EXAMPLE 3

A sterile pre-stage solution (composition: 2.0 g. of cane sugar, 7.0 g. of cornsteep liquor, 1.0 g. of fatty oils, 1.0 g. of calcium carbonate in 100 ml. of water) is inoculated with spores of penicillium chrysogenum and shaken for 26 hours at 25° C. This culture solution is introduced into a pre-fermenter (sterile nutrient solution: 7.4 kg. of cane sugar, 28 kg. of cornsteep liquor, 3.7 g. of calcium carbonate, 3.7 liters of fatty oils, 370 liters of water) and fermented for 36 hours at 25° C., while thoroughly stirring and introducing air. Thereupon the solution is transferred into the main fermentation stage (sterile nutrient solution: 170 kg. of lactose, 106.5 kg. of dry cornsteep, 12.75 kg. of calcium carbonate, 17.7 kg. of primary potassium phosphate, 4.94 kg. of magnesium sulfate, 6.25 liters of fatty oils, filled up to 2500 liters with water), which is fermented at 25° C. while thoroughly stirring and introducing air. From the 71st hour onward 192.5 g. of the potassium salt of 3-thienyloxy-acetic acid, dissolved in 5 liters of water, are added every 3 hours in 20 individual doses respectively as precursor.

After 147 hours of fermentation 2200 u./ml. are obtained. The volume is then 2200 liters, after filtration and washing 2950 liters.

The further treatment is carried out according to Example 1, whereupon 35 liters of a concentrated butyl acetate solution dried with anhydrous sodium trisulfate are obtained.

The penicillin is separated from the precursor by fractionated precipitation with methanolic potassium acetate solution.

| Fraction No. | Potassium acetate solution added, ml. | Yield, g. | Content, u./mg. |
| --- | --- | --- | --- |
| 1 | 2,000 | 368.0 | <50 |
| 2 | 1,000 | 350.5 | <50 |
| 3 | 2,000 | 1045.5 | 1,487 |
| 4 | 2,000 | 676.5 | 1,225 |
| 5 | 3,000 | (*) | |

*No precipitation.

Fractions 3 and 4 then contain 2380 million units or 49.2% of the penicillin contained in the culture solution. The yield of precursor recovered is 34.5% of that used for this process, and is pure enough to be employed in the following fermentation process.

EXAMPLE 4

Comparative test for the separation of penicillin V from phenoxy-acetic acid.

As starting solution a penicillin fermentation culture filtrate is used, which contains 44.6 g. of penicillin V and 46.5 g. of phenoxy acetic acid (both calculated as free acids) in a volume of 53 liters. The penicillin V is isolated according to Example 1:

After adding a layer of butyl acetate the whole is acidified to pH 1.95, the organic phase is separated and the aqueous layer is again extracted with the same solvent. After transferring the acids from the butyl acetate into an aqueous buffer solution at pH 7 the aqueous layer is again acidified to pH 1.95 under a butyl acetate layer and after separation the organic phase is dried with anhydrous sodium sulfate. The final volume after filtration and washing is 4.55 liters. In accordance with Examples 1–3 the fractionated precipitation is effected by addition of a solution of 20% strength, of anhydrous potassium acetate in methanol:

| Fraction No. | Potassium acetate solution added, ml. | Yield, g. | Activity,[1] u./mg. |
| --- | --- | --- | --- |
| 1 | 50 | 12.0 | 58 |
| 2 | 50 | 23.0 | 650 |
| 3 | 50 | 20.8 | 840 |
| 4 | 50 | 22.0 | 825 |
| 5 | 100 | 16.8 | 950 |
| 6 | 100 | 16.0 | [2] <20 |

[1] Determined biologically in comparison with penicillin V (vf. USP Reference Standard of 1672 u./mg.).
[2] Potassium acetate.

As solid substances in fractions 1–5, 92.3% of the total of penicillin V and precursor are recovered, which substances have 88.9% of the biological activity of the penicillin V present at the beginning, but no fraction contains in addition to the precursor more than 950 u./mg. or approximately 62% of penicillin V (the pure potassium salt of penicillin V contains 1529 u./mg.

EXAMPLE 5

Comparative test for the separation of penicillin V from phenoxy-acetic acid in a solution of nearly equivalent quantities.

As starting solution a penicillin-fermentation-culture solution is used which contains 146.10 g., corresponding to 0.417 mol of penicillin V, and 68.46 g., corresponding to 0.45 mol of phenoxy-acetic acid, in a volume of 55 liters. The isolation is carried out according to Example 4.

The final volume of the dried butyl acetate solution is 3.74 liters. The following table lists the results of the fractionated precipitation with anhydrous potassium acetate of 20% strength in methanol:

| Fraction No. | Potassium acetate solution added, ml. | Yield, g. | Activity,[1] u./mg. |
| --- | --- | --- | --- |
| 1 | 80 | 45.3 | 1260 |
| 2 | 80 | 31.7 | 870 |
| 3 | 80 | 42.5 | 975 |
| 4 | 80 | 39.3 | 1095 |
| 5 | 80 | 35.1 | 890 |
| 6 | 80 | 9.1 | 650 |
| 7 | 80 | 0.8 | 1,310 |

[1] Determined biologically in comparison with penicillin V (USP Reference Standard of 1,672 u./mg.).

In this case, too, as well as in Example 4, a separation of penicillin V and precursor is not achieved.

EXAMPLE 6

80 ml. of a sterile nutrient solution of 20 g. of cane sugar, 10 g. of calcium carbonate and 76 g. of cornsteep liquor, filled to 1000 ml. with water, are introduced into an Erlenmeyer flask of a capacity of 300 liters, inoculated with spores of penicillium chrysogenum and shaken for 48 hours at 25° C. 3 ml. of this pre-stage culture are introduced into 50 ml. of a sterile main culture solution (composition: 55 g. of lactose, 50 g. of cornsteep liquor, 7 g. of primary potassium phosphate, 10 g. of calcium carbonate, 3 g. of magnesium sulfate, filled to 1000 ml. with water) and shaken at 25° C. After 24 hours 125 mg. of 3-thienyloxy-acetic acid are added as precursor. After shaking for further 96 hours 1409 units of penicillin stable to acids are found per ml. of solution. The further treatment is carried out according to Example 1 and leads to the same results.

EXAMPLE 7

In accordance with Example 6, but when adding 125 mg. of 3-thienyloxy-acetic acid amide as precursor, 1567 units of acid-stable penicillin are obtained per ml. of solution, when adding 125 mg. of sodium salt of 3-thienyloxy-acetic acid as precursor, 2020 units of acid-stable penicillin are obtained per ml. of solution, when adding 125 mg. of 2-methyl-4-thienyloxy-acetic acid as precursor, 1885 units of acid-stable penicillin are obtained per ml. of solution, or when adding 125 mg. of 2-methyl-5-thienyloxy-acetic acid as precursor, 1482 units of acid-stable penicillin are obtained per ml. of solution.

In a comparative test no precursor is added to the culture solution, no acid-stable penicillin is formed.

EXAMPLE 8

656.6 g. of potassium salt of 3-thienyloxy-methyl-penicillin, having in the biological test an activity of 1515 u./mg., is dissolved in 3.0 liters of water free from salt, cleared with 15 g. of charcoal, filtered with suction, and the filtrate is washed with 100 ml. of salt free water. While thoroughly stirring, 1 N-hydrochloric acid is slowly added dropwise to the filtrate. When turbidity sets in, 2 g. of the pure crystallised free acid of 3-thienyloxy-methyl-penicillin are introduced into the filtrate, and by adding further quantities of hydrochloric acid the pH-value is adjusted to 2.0. After stirring for one hour the precipitate is filtered with suction, washed with 200 ml. of water free from salt, and dried at 2–5 mm. Hg for 24 hours at room temperature, and for 5 hours at 50° C. The yield is 571.3 g. or 91.7% of the biological activity of the potassium salt used. The biological activity is found at 1620 u./mg.

The free acid of 3-thienyloxy-methyl-penicillin crystallises to form colorless needles which melt after preceding sintering at approximately 120° C. under decomposition.

IR spectrum: a strong band, characteristic of the β-lactam ring, (C=O oscillation) at 1760K proves the presence of the penicillin structure.

Determination of activity: the biological test against *staph. aureus* ATCC 6538 P yields 1650 u./mg.

The stability to acids corresponds to that of the potassium salt, if the free acid has been dissolved in water before the test by addition of alkaline agents (buffer).

Solubility: very sparingly soluble in water, fairly to easily soluble in the usual organic solvents.

EXAMPLE 9

450.0 g. of the potassium salt of 3-thienyloxy-methyl-penicillin of a content of 990 u./mg. and 27.5 g. of 1110 u./mg. are dissolved in 60 l. of water free from salt and filtered with suction by means of 15 g. of charcoal. 18 liters of ice-water are added and while stirring, the solution is slowly adjusted to pH 2.0 by adding 1 N-hydrochloric acid. When turbidity sets in at a pH of about 3.5, 2.0 g. of the pure free acid of the penicillin are introduced by inoculation. After stirring for one hour the whole is filtered with suction, washed with a small quantity of water and the filtration residue is dried at 2–5 mm. Hg for 10 hours at room temperature, and for 4 hours at 40° C. The yield of the free acid of 3-thienyloxy-methyl-penicillin is 249.0 g.; the biological activity is 1650 u./mg.

EXAMPLE 10

30 g. of the potassium salt of 3-thienyloxy-methyl-penicillin of a biological activity of 1394 u./mg. are dissolved in 250 ml. of water free from salt. Subsequently a solution of 32.4 g. of N,N′-dibenzyl-ethylene-diamine-diacetate in 250 ml. of water free from salt is slowly added dropwise. On formation of the first turbidity a small quantity of the crystallised salt is added, the dropwise addition of the above solution is continued and 1.0 litre of water free from salt is added. After stirring for 30 minutes the whole is filtered with suction, washed with 100 ml. of water and dried at 2–5 mm. Hg for 12 hours at room temperature. The yield of the salt is 33.0 g.

The salt crystallises to form colorless small needles which melt at about 135–140° C. under decomposition.

IR spectrum: a strong band characteristic of the β-lactam ring, at 1773K gives proof of the penicillin structure.

Activity: the biological test gives an activity of 1274 u./mg.

The solubility of the salt in water is approximately 0.5 g. per litre at room temperature.

EXAMPLE 11

10.0 g. of the free acid of 3-thienyloxy-methyl-penicillin are dissolved in 400 ml. of n-butyl acetate an 4.11 g. of N-ethyl-piperidine are added. After inoculation the N-ethyl-piperidine salt of 3-thienyloxy-methyl-penicillin crystallises out. After stirring for a short period of time the whole is filtered with suction, washed with 30 ml. of pure butyl acetate and dried at 1–5 mm. Hg for 12 hours at room temperature and for 4 hours at 50° C.

The yield is 12.0 g. of colorless crytalline salt which melts at 126–128° C. under decomposition and which is very easily soluble in water.

The biological test gives an activity of 1180 u./mg.

The IR spectrum shows the β-lactam band at approximately 1770–1775K.

EXAMPLE 12

10 g. of the potassium salt of 3-thienyloxy-methyl-penicillin are dissolved in 100 ml. of water and 8.96 g. of procain-hydrochloride in 25 ml. of water are added. After inoculation the porcain salt of 3-thienyloxy-methyl-penicillin crystallises to form colorless prismatic needles which in many cases stick together in the form of fairly large bunches. After filtering with suction the filtrate is washed with water and dried at 1–5 mm. Hg for 15 hours at room temperature, and for 4 hours at 50° C.

The yield is 13.5 g.; the salt melts at approximately 97–100° C. with decomposition, it is sparingly soluble in water, but easily soluble in ethanol.

The biological test gives an activity of 995 u./mg.

The IR spectrum shows the strong β-lactam band at approximately 1775K.

EXAMPLE 13

10 g. of the potassium salt of 3-thienyloxy-methyl-penicillin in 100 ml. of water are mixed with 8.08 g. of 3.3′-diphenyl-propene-(2)-amine-hydrochloride in 300 ml. of water. After trituration with water the initially smeary salt crystallises out. It is filtered with suction and dried for 36 hours at room temperature in vacuo.

The yield is 12.85 g. of crystalline needles, which melt at approximately 128° C. with decomposition. The salt is not soluble in water, but easily soluble in methanol.

The biological test gives an activity of 1170 u./mg.

The IR spectrum shows a strong C=O band (β-lactam) at 1775K.

EXAMPLE 14

10 g. of the free acid of 3-thienyloxy-methyl-penicillin are dissolved in 330 ml. of butyl acetate saturated with water, 40 g. of anhydrous sodium sulfate are added, the whole is filtered with suction and washed with 20 ml. of n-butyl acetate. Then 7.17 g. of dibenzyl amine are added dropwise while stirring. The crystallised salt is filtered with suction after stirring for 30 minutes, washed with a small amount of butyl acetate and dried in vacuo at room temperature.

The yield is 14.5 g. of a colorless crystallised salt, which melts at approximately 86-87° C. with decomposition. It is sparingly soluble in methanol.

The biological test gives an activity of 108 u./mg.

The IR spectrum shows a strong C=O band (β-lactam) at approximately 1775K.

EXAMPLE 15

10 g. of the free acid of 3-thienyloxy-methyl-penicillin are dissolved according to Example 14 in n-butyl acetate and mixed with 2.14 g. of n-propylamine-(1). After inoculation and stirring the initially turbid oily precipitate crystallises out. After 30 minutes the whole is filtered with suction, washed with a small amount of butyl acetate and dried in vacuo at room temperature. The yield of colorless salt is 10.8 g., which melt at approximately 85° C. with decomposition. The salt is easily soluble in water.

Th biological test gives an activity of 1240 u./mg.

The IR spectrum has a strong C=O band (β-lactum) at 1780K.

We claim:
1. Thienyloxy-methyl penicillins of the general formula

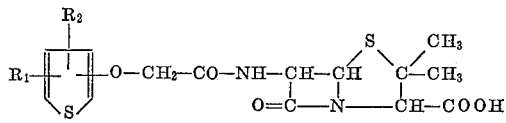

wherein $R_1$ and $R_2$ each represents hydrogen or a methyl group, and their physiologically tolerated salts.

2. 3-thienyloxy methyl penicillin and its physiologically tolerated salts.

References Cited

UNITED STATES PATENTS

| | | | |
|---|---|---|---|
| 2,479,295 | 8/1949 | Behrens et al. | 260—239.1 |
| 2,479,296 | 8/1949 | Behrens et al. | 260—239.1 |
| 2,479,297 | 8/1949 | Behrens et al. | 260—239.1 |

NICHOLAS S. RIZZO, Primary Examiner

U.S. Cl. X.R.

195—36; 260—999